(12) United States Patent
Voegele

(10) Patent No.: US 7,478,719 B2
(45) Date of Patent: Jan. 20, 2009

(54) CORE PLATE STRUCTURE

(75) Inventor: Richard Voegele, Altlussheim (DE)

(73) Assignee: BorgWarner Inc., Auburn Hills, MI (US)

( * ) Notice: Subject to any disclaimer, the term of this patent is extended or adjusted under 35 U.S.C. 154(b) by 350 days.

(21) Appl. No.: 11/254,985

(22) Filed: Oct. 20, 2005

(65) Prior Publication Data

US 2006/0144668 A1    Jul. 6, 2006

(30) Foreign Application Priority Data

Oct. 21, 2004   (EP)   .................................. 04025013

(51) Int. Cl.
  *F16D 13/64* (2006.01)
(52) U.S. Cl. ................................. 192/107 R
(58) Field of Classification Search ........................ None
  See application file for complete search history.

(56) References Cited

U.S. PATENT DOCUMENTS

| 2,330,856 | A | * | 10/1943 | Adamson | .................. 192/70.14 |
| 4,449,621 | A | * | 5/1984 | F'Geppert | ................. 192/70.13 |
| 4,674,616 | A | * | 6/1987 | Mannino, Jr. | ............ 192/107 R |
| 6,575,279 | B2 | * | 6/2003 | Quigley | ........................ 192/46 |

* cited by examiner

*Primary Examiner*—Richard M. Lorence
(74) *Attorney, Agent, or Firm*—Warn Partners, P.C.

(57) ABSTRACT

The invention concerns a segmented core plate for a disc. In accordance with the invention, provision is made for the core plate to be composed of multiple, especially two, segmented core plate discs, wherein segments of adjacent core plate discs are arranged offset relative to one another. An adhesive method, a welding method, or riveting are proposed for manufacturing the core plate or the disc.

8 Claims, 2 Drawing Sheets

CORE PLATE STRUCTURE

CROSS-FREFERENCE TO RELATED APPLICATIONS

This application claims priority to European Patent Application No. 04 025013.6 filed on Oct. 21, 2004.

FIELD OF THE INVENTION

The invention concerns a core plate for a disc, a disc, a method for manufacturing a core plate, and a method for manufacturing a disc.

BACKGROUND OF THE INVENTION

Brake or clutch units have one or more friction plates that preferably have an essentially annular shape. Multiple-plate clutches are based on two or more friction plates generally called discs. A first group of these discs, known as the outer discs, are joined in a rotationally fixed manner, for example by means of appropriate splining, to an outer disc carrier that is coupled to a first shaft, for example an input drive shaft, and a second group of these discs, known as the inner discs, are joined in a rotationally fixed manner to an inner disc carrier that is coupled to a second shaft, for example an output drive shaft. The discs of the two groups engage one another in alternation, forming a disc pack. In this context, the outer discs and inner discs are capable of limited motion toward one another in the axial direction, thereby frictionally engaging in pairs at their adjoining faces. A distinction is drawn between discs with and without friction lining.

Friction plates or discs with friction lining preferably have a metallic, annular core plate which carries, on one or both faces, a friction lining made, for example of a fibrous material produced from organic or inorganic substances. Friction plates without friction linings, known as steel discs, consist essentially of the core plate alone.

Friction linings of the aforementioned type were initially designed as a single piece. Since the fibrous material is generally present in the form of sheets from which the friction linings are cut or separated, considerable unusable cutting waste results.

In order to save on friction material, it has thus subsequently become common practice to cut or stamp sections of friction lining in the form of segments, especially segments of an annulus, from a thin (fibrous) material and to assemble them on the core plate into an, e.g., annular friction lining consisting of many segments arranged in the circumferential direction, or if desired the radial direction as well. A variety of methods with greater or lesser cutting waste are used in this context. Referenced here by way of example are the implementations in U.S. Pat. Nos. 4,260,047, 6,019,205, WO 99/64755 A1 and U.S. Pat. No. 6,409,006 B1.

Essentially the same need for economy of material and the associated cost reduction in manufacturing exists for the metallic core plates used. In similar fashion, U.S. Pat. No. 4,674,616 thus proposes also assembling from multiple annular segments the metallic core plate of a disc provided on both sides with a friction lining made of a fibrous material. In order to achieve adequate mechanical stability of such a disc with a core plate assembled from annular segments, the individual annular segments have projections and recesses with complementary shapes at their ends where they are assembled. Moreover, the segments of the likewise segmented, and preferably fibrous, friction lining can be arranged to be offset circumferentially relative to the core plate segments.

Even though this design of discs having a friction lining made of fibrous material has in essence proven its utility, its mechanical stability is not always adequate. In particular, discs with no friction lining or with a friction lining on only one side frequently cannot be manufactured with the requisite mechanical stability when the core plate is segmented.

Consequently, the object of the invention is to provide a segmented core plate for a disc, and also a disc with a segmented core plate, which have greater mechanical stability. An additional object is to specify a method for manufacturing the same.

This object is attained in accordance with the invention by a segmented core plate for a disc, a disc with segmented core plate, a method for manufacturing a segmented core plate, and a method for manufacturing a disc with segmented core plate.

It has become apparent that a disc produced according to the teaching of U.S. Pat. No. 4,674,616 frequently does not achieve the requisite mechanical stability because the complementarity of shapes of the connected core plate segments cannot be manufactured with sufficient precision. As a result, not only is movement between adjacent segments possible perpendicular to the friction surface, but tilting of adjacent segments may also occur. While the fibrous material of the friction lining and the segments themselves have adequate strength to prevent parallel displacement of adjacent core plate segments, the aforementioned tipping motions cannot be adequately absorbed by the friction lining and the segments themselves. This problem occurs to an even greater degree in segmented core plates without friction linings in which mechanical stability must be achieved solely through the fastening of adjacent segments.

SUMMARY OF THE INVENTION

The invention is thus based on the realization that tilting of adjacent core plate segments must be prevented in order to increase mechanical stability.

In accordance with the invention, the segmented core plate is thus composed of multiple, especially two, segmented core plate discs. In this regard, the segments of adjacent core plate discs are preferably, but not necessarily, arranged offset with regard to one another (preferably by half a segment division). This measure makes it impossible for adjacent segments within a core plate disc to be twisted relative to one another, since the (metallic) material of which the core plates are produced is much more difficult to bend than the fibrous material of a friction lining. The core plate is thus nearly as mechanically stable as a core plate produced as a single piece.

Although stability increases with an increasing number of core plate discs up to a certain upper limit, it is desirable to assemble the core plate of only two core plate discs in order to keep down the number of production steps, and thus the manufacturing costs. The number of segments used per core plate disc is arbitrary in principle. Division into an odd number of segments is not necessary for stability reasons. It is recommended to provide more than three segments per core plate disc. The number of segments actually provided is generally determined by manufacturing costs; on the one hand, material savings is increased by a larger number of segments, but at the same time, production cost increases as a result of additional manufacturing steps.

In an especially advantageous embodiment of the invention, provision is made for segments of adjacent core plate discs to be mechanically joined to one another, for example welded or riveted.

A core plate can be manufactured by adhesive bonding, in a simple and thus economical manner, as follows.

In a first step, a cold rolled metal strip is provided on one or both sides with an elastic adhesive. Pickling or sizing processes may be omitted.

The application of the adhesive to the cold rolled strip has advantages, since the narrow width of the cold rolled strip allows a simple brushing or grinding treatment and roller adhesive application with subsequent drying to be carried out.

In a second step, segments (preferably identical) for the core plate discs are stamped out of the cold rolled metal strip.

In a third step, a first core plate disc is assembled from the stamped-out segments.

In a fourth step, a second core plate disc is assembled from the stamped-out segments on one of the annular sides of the first core plate disc (preferably offset by a half segment division for reasons of symmetry and stability). If necessary, an additional core plate discs are assembled from the stamped-out segments on each of the free annular sides of the assembled core plate discs (again preferably offset by a half segment division).

The entire package of stacked core plate discs is glued together in a bonding process in a fifth step. Welding methods may also be used instead of gluing the core plate discs. In particular, provision is made in accordance with the invention to weld the core plate discs to one another through a spot weld or roll seam weld or a welding bead. The weld point or welding bead should if possible be on the lining side or on the outer and/or inner edge of the core plate.

In place of an adhesive or welding process, other methods for producing a rotationally fixed connection between adjacent core plate discs also come into consideration. In particular, provision is made according to the invention to produce a rotationally fixed connection between adjacent core plate discs by means of complementary shaped projections and recesses in neighboring core plate discs, for example in the form of tabs and corresponding slots, advantageously extending radially.

In principle, other means for joining adjacent core plate discs in a rotationally fixed manner, and potentially creating a frictional connection between them, also come into consideration. The choice a practitioner of the art makes among these arrangements and methods in the individual case depends on the one hand on cost, and on the other hand on the requirements for mechanical stability of the core plates to be produced.

In order to ensure that the individual segments of a core plate disc are correctly joined to one another, which is to say in particular in an interlocking and offset-free manner, while also achieving the greatest possible mechanical load capacity of the core plate, provision is made according to the invention that adjacent segments of each core plate disc have, at their adjacent ends (in the assembled state), complementary shaped recesses and projections which engage one another.

It must be expressly noted here that the segments of the individual core plate discs can in principle be designed in the same manner as the segments of the core plates and/or friction linings described in the documents cited in the introduction to the description.

In order to be able to produce a rotationally fixed connection to a respective outer or inner disc carrier, provision is made according to the invention for the relevant core plate discs to have—preferably corresponding—internal or external splining. This external or internal splining is also suitable for precisely aligning the individual segments of a core plate disc to one another, for example in a bonding tool, before they are joined together in an rotationally fixed manner, for example in the bonding process described above.

Although a core plate of the above-described type can function by itself as a disc without a friction lining (a disc of this nature is generally referred to in technical parlance as a steel disc), a friction lining, in particular consisting of a fibrous material, may be provided on one face or on both faces of the laminated and segmented core plate.

This friction lining can be designed, for example, to be segmented (and laminated if desired) as described in the documents cited in the introduction to the description.

A method for producing a disc in accordance with the invention can have the following process steps.

In a first step, a cold rolled metal strip can be provided on one or both sides with an elastic adhesive.

In a second step, segments (preferably identical) for the core plate discs are stamped out of the cold rolled metal strip. These may have splining that is complementary in form and function.

In a third step, a first core plate disc is assembled from the stamped-out segments. The assembly can be accomplished, for example, by planishing, complementary-shaped splining, and/or welding.

In a fourth step, a second core plate disc is assembled from the stamped-out segments on one of the faces of the first core plate disc, preferably offset by a half segment division. Depending on the design of the core plate segments, the assembly is again accomplished, for example, by means of planishing, complementary-shaped splining, or welding. If necessary, additional core plate discs are assembled from the stamped-out segments on one of the free faces of the assembled core plate discs with an offset (by a half segment division, for example). If desired, a friction lining, likewise segmented if desired, is arranged on one or both free annular sides.

The core plate discs and, if applicable, the friction lining or linings, are bonded to one another in a bonding step in a fifth step. After that, the steel disc is polished.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention is now explained in detail on the basis of the drawing. It shows.

DETAILED DESCRIPTION OF THE PREFERRED EMBODIMENTS

Figure 1:
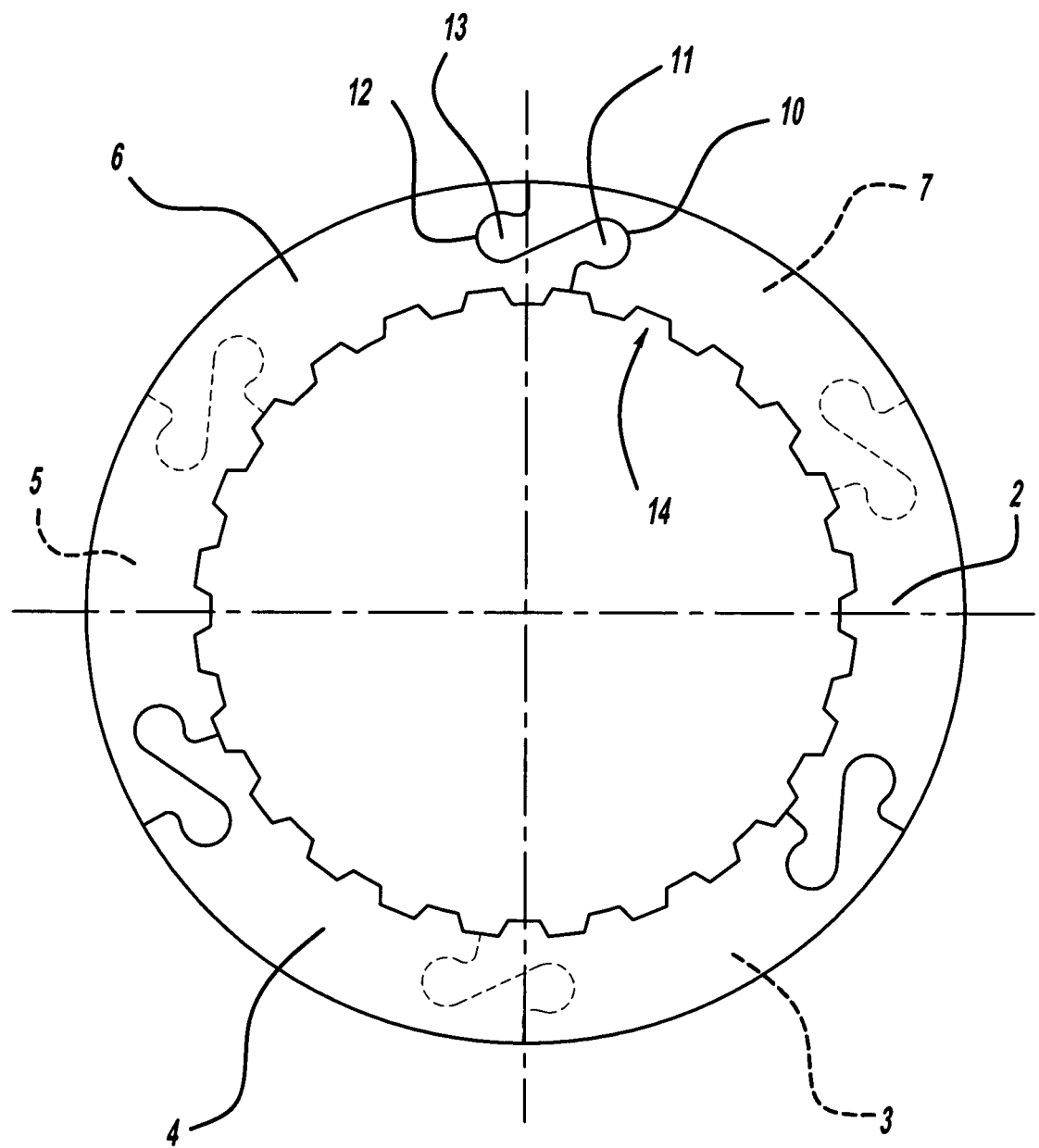
FIG. 1, a core plate for a friction disc or a disc without a friction lining.

The core plate 1 includes two core plate discs, a first core plate disc 1a and a second core plate disc 1b.

The two core plate discs 1a and 1b are largely identical in design. In the present example embodiment, each core plate disc 1a, 1b consists of six identical individual segments 2, 3, 4, 5, 6, 7. Each segment 2, 3, 4, 5, 6, 7; has as its ends a projection 11, 13 and a recess 10, 12. The projections 11, 13 and the recesses 10, 12 of the fifth and sixth segments 6, 7 of the first core plate disc 1a are provided with appropriate reference numbers in FIG. 1 by way of example. Recesses 10, 12 and projections of adjacent segments 2, 3, 4, 5, 6, 7, are designed with complementary shapes so that the individual segments 2 through 7 can be assembled into a ring in simple manner.

The core plate disc 1a drawn by way of example has splining 14 on its inner circumference. This splining 14 is provided for the purpose of connecting the core plate 1 in a rotationally fixed manner to an inner core plate carrier (not shown), which has a corresponding external splining.

The two core plate discs 1a, 1b which form the core plate 1 are stacked one upon the other and are connected to one another in a rotationally fixed manner. The individual segments 2 through 7 of the two core plate discs 1a, 1b are arranged offset with respect to one another in this context. Preferably, an offset by a half segment division is chosen here. In FIG. 1, the offset of the individual segments 2 through 7 of the two core plate discs 1a, 1b are labeled with reference numbers 15 and 16.

Figure 2:
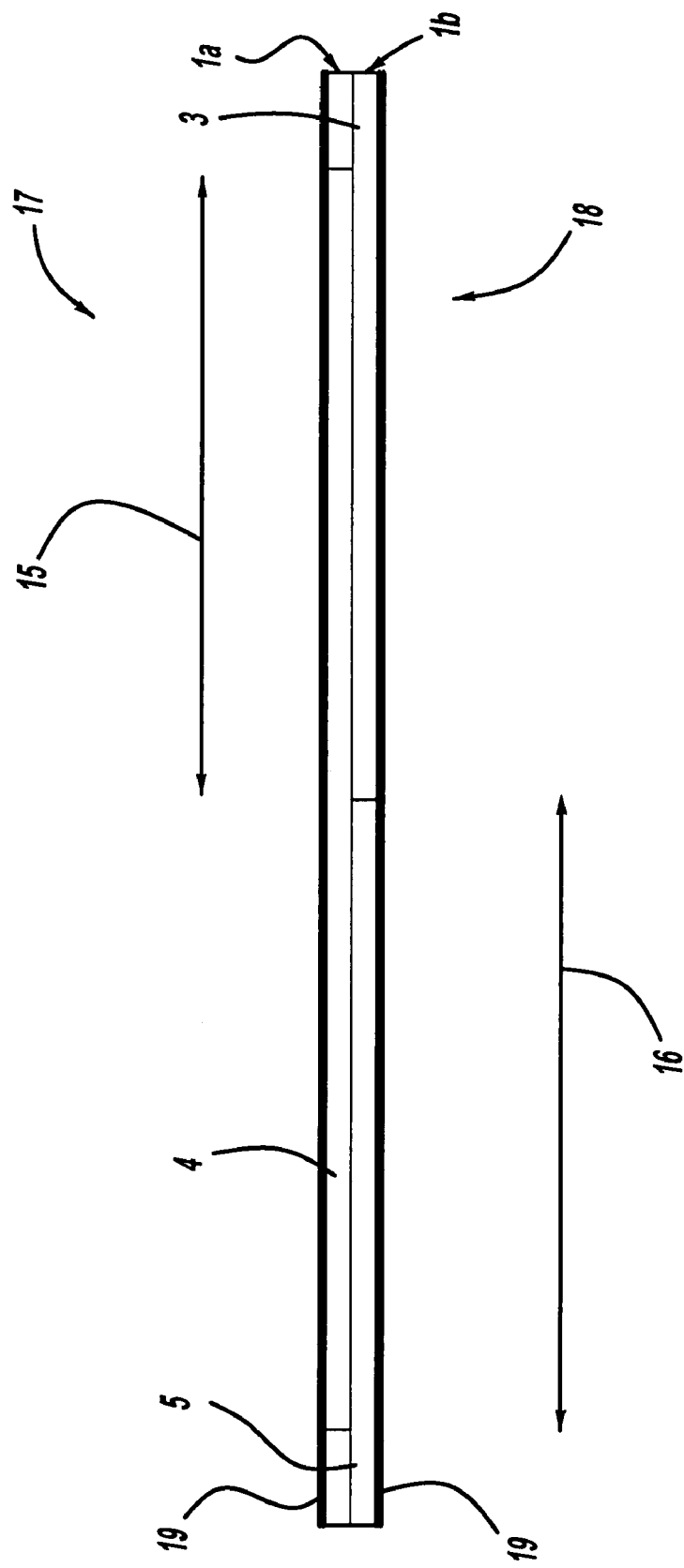
FIG. 2 shows a segmented core plate 1 for a friction disc with friction lining or a disc without a friction lining according to the invention.

In the absence of a friction lining, the core plate 1 shown in FIG. 1 constitutes an unlined disk. As already described above in detail and shown in FIG. 2, the core plate 1 can carry, on one or both annular faces 17, 18, a friction lining 19 consisting of a fibrous material. It is then referred to as a friction disc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A core plate structure comprising:
   a first core plate disc having three or more segments having a recess and a projection at each end of said three or more segments forming complimentary shapes for interlocking together each of the three or more segments to form the first core plate disc; and
   a second core plate disc having three or more segments having a recess and a projection at each end of said three or more segments forming complimentary shapes for interlocking each of the three or more segments to form said second core plate disc, wherein said first core plate disc and said second core plate disc are connected together to form said core plate.

2. The core plate structure of claim 1, wherein the said plurality of core plate discs have internal splining that is corresponding.

3. The core plate structure of claim 1, wherein the core plate comprises at least two segmented core plate discs, wherein segments of adjacent core plate discs are arranged offset with regard to one another.

4. The core plate structure of claim 3, wherein adjacent segments of a given core plate disc have, at a respective end and thereof, recesses and projections of complementary shapes.

5. The core plate structure of claim 3, said disc includes a first and a second annular surface, wherein a friction lining being provided on either said first annular surface said second annular surface or both said first and said second annular surfaces.

6. The core plate structure of claim 5, wherein the friction lining is segmented or is implemented as a full ring.

7. The core plate structure of claim 5, wherein said friction lining is a fibrous material.

8. The core plate structure of claim 5 wherein each of said segments of said first core plate disc are arranged off-set by one-half of the length of the segments of said second core plate disc.

\* \* \* \* \*